United States Patent
Herzinger et al.

(10) Patent No.: US 9,222,500 B2
(45) Date of Patent: *Dec. 29, 2015

(54) COMPONENT CONNECTION AND METHOD FOR THE DETACHABLE CONNECTION OF THE COMPONENTS OF A COMPONENT CONNECTION

(71) Applicant: Bayerische Motoren Werke Aktiengesellschaft, Munich (DE)

(72) Inventors: Thomas Herzinger, Munich (DE); Johann van Niekerk, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 11 days.

This patent is subject to a terminal disclaimer.

(21) Appl. No.: 13/678,030

(22) Filed: Nov. 15, 2012

(65) Prior Publication Data

US 2013/0071181 A1 Mar. 21, 2013

Related U.S. Application Data

(63) Continuation of application No. PCT/EP2011/004561, filed on Sep. 10, 2011.

(30) Foreign Application Priority Data

Oct. 22, 2010 (DE) .......................... 10 2010 042 803

(51) Int. Cl.
*G05G 1/12* (2006.01)
*F16B 21/07* (2006.01)
(Continued)

(52) U.S. Cl.
CPC ............. *F16B 21/07* (2013.01); *B23K 37/0408* (2013.01); *B29C 65/72* (2013.01);
(Continued)

(58) Field of Classification Search
CPC ..................... Y10T 403/7039; B23K 37/0408; B23K 2201/006; F16B 5/0642; F16B 5/0664; F16B 5/08; F16B 21/07; F16B 21/071
USPC ................... 403/114, 266, 373, 374.1, 408.1; 219/117.1, 121.14, 121.64, 137 R; 228/135, 136, 212, 213; 24/289, 293, 24/294, 295, 453, 458, 581.11; 296/29
See application file for complete search history.

(56) References Cited

U.S. PATENT DOCUMENTS 2,275,900 A * 3/1942 Hall ................................ 52/511
3,338,293 A * 8/1967 Hohmann ................ 160/370.21
(Continued)

FOREIGN PATENT DOCUMENTS

DE 33 02 177 A1 8/1983
DE 34 14 845 A1 6/1985
(Continued)

OTHER PUBLICATIONS

German Office Action dated Aug. 3, 2010 including English-language translation (Eight (8) pages).
(Continued)

*Primary Examiner* — Daniel P Stodola
*Assistant Examiner* — Nahid Amiri
(74) *Attorney, Agent, or Firm* — Crowell & Moring LLP

(57) ABSTRACT

A connection between components includes a first component, a second component, and at least two pairs of fixing elements spaced apart by which the two components are detachably connected. Each pair of fixing elements has a female fixing element and a male fixing element that is inserted into the female fixing element. A fixing element of each pair of fixing elements is provided on the first component and the other fixing element of each pair of fixing elements is provided on the second component. The fixing elements are arranged such that on detachable connection of the two components by the pairs of fixing elements in the two components, a bending stress results in the components.

28 Claims, 3 Drawing Sheets

(51) Int. Cl.
*B23K 37/04* (2006.01)
*F16B 5/06* (2006.01)
*B29C 65/72* (2006.01)
*F16B 5/08* (2006.01)

(52) U.S. Cl.
CPC ........ *F16B 5/0642* (2013.01); *B23K 2201/006* (2013.01); *F16B 5/0664* (2013.01); *F16B 5/08* (2013.01); *F16B 21/071* (2013.01); *Y10T 403/7039* (2015.01)

(56) References Cited

U.S. PATENT DOCUMENTS

| | | | |
|---|---|---|---|
| 3,696,442 | A | 10/1972 | Amundsen et al. |
| 4,438,971 | A * | 3/1984 | Zaydel et al. .................. 296/191 |
| 4,637,116 | A | 1/1987 | Parisch et al. |
| 4,942,539 | A | 7/1990 | McGee et al. |
| 5,013,175 | A * | 5/1991 | Hayden ........................... 403/24 |
| 5,150,623 | A | 9/1992 | Woods |
| 5,441,095 | A | 8/1995 | Trethewey |
| 5,580,204 | A * | 12/1996 | Hultman ...................... 411/509 |
| 5,727,300 | A | 3/1998 | Ekdahl et al. |
| 5,755,526 | A * | 5/1998 | Stanevich .................... 403/122 |
| 6,129,411 | A | 10/2000 | Neff et al. |
| 6,209,175 | B1 * | 4/2001 | Gershenson ..................... 24/297 |
| 6,405,983 | B1 * | 6/2002 | Goj ............................. 248/205.1 |
| 6,857,809 | B2 * | 2/2005 | Granata ........................ 403/121 |
| 7,354,217 | B2 * | 4/2008 | Soder ......................... 403/374.5 |
| 8,064,686 | B2 | 11/2011 | Wagner et al. |
| 2003/0090682 | A1 | 5/2003 | Gooch et al. |
| 2004/0104599 | A1 | 6/2004 | Svendsen et al. |
| 2007/0079491 | A1 | 4/2007 | Hader |
| 2008/0210672 | A1 | 9/2008 | Meyer et al. |
| 2009/0070983 | A1 | 3/2009 | Stumpf et al. |
| 2009/0194650 | A1 * | 8/2009 | Corvo et al. ................. 248/205.3 |
| 2011/0173797 | A1 | 7/2011 | van Niekerk et al. |

FOREIGN PATENT DOCUMENTS

| | | |
|---|---|---|
| DE | 197 39 350 A1 | 3/1999 |
| DE | 197 41 062 A1 | 4/1999 |
| DE | 197 45 728 A1 | 4/1999 |
| DE | 199 29 057 A1 | 12/2000 |
| DE | 698 00 282 T2 | 3/2001 |
| DE | 202 05 694 U1 | 8/2002 |
| DE | 696 32 309 T2 | 9/2004 |
| DE | 102 50 392 B4 | 12/2004 |
| DE | 10 2004 046 584 A1 | 5/2005 |
| DE | 602 20 252 T2 | 1/2008 |
| DE | 10 2007 044 635 A1 | 4/2009 |
| DE | 10 2007 061 803 B3 | 6/2009 |
| DE | 10 2008 038 747 A1 | 2/2010 |
| DE | 10 2009 049 602 B3 | 7/2011 |
| DE | 10 2010 028 322 A1 | 11/2011 |
| DE | 10 2010 028 323 A1 | 11/2011 |
| DE | 10 2010 040 547 A1 | 3/2012 |
| EP | 1 772 199 A1 | 4/2007 |
| EP | 2 154 054 A1 | 2/2010 |
| FR | 2 761 626 A1 | 10/1998 |

OTHER PUBLICATIONS

International Search Report for PCT/EP2010/004746 (U.S. Appl. No. 13/074,881) including English-language translation (Four (4) page).

International Search Report for PCT International Application PCT/EP2011/000865 (U.S. Appl. No. 13/656,139) including English translation (Four (4) pages).

German Office Action dated Aug. 8, 2011 with English translation (ten (10) pages).

International Search Report dated May 4, 2012 with English translation (four (4) pages).

* cited by examiner

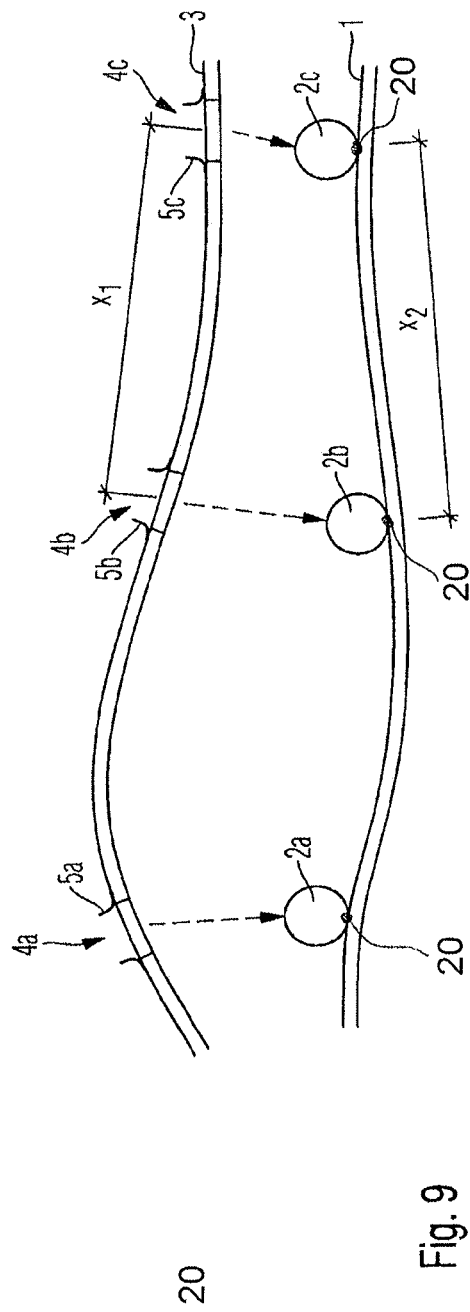
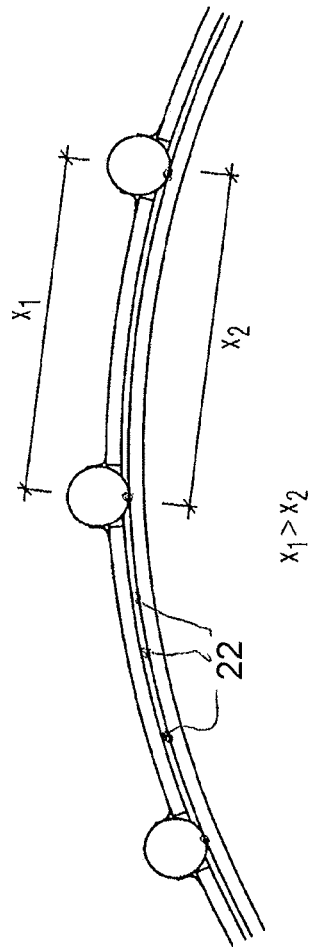
Fig. 9
Fig. 10

COMPONENT CONNECTION AND METHOD FOR THE DETACHABLE CONNECTION OF THE COMPONENTS OF A COMPONENT CONNECTION

CROSS-REFERENCE TO RELATED APPLICATIONS

This application is a continuation of PCT International Application No. PCT/EP2011/004561, filed Sep. 10, 2011, which claims priority under 35 U.S.C. §119 from German Patent Application No. DE 10 2010 042 803.5, filed Oct. 22, 2010, the entire disclosures of which are herein expressly incorporated by reference.

BACKGROUND AND SUMMARY OF THE INVENTION

The present invention relates to a connection between components, in which a first component, a second component, and at least two pairs of fixing elements are provided. The two pairs of fixing elements are arranged at a distance from one another. By way of the two pairs of fixing elements, the two components are detachably connected to each other.

Closely in connection with the object of the present patent application are component connections that are known from two previously unpublished German patent applications DE 10 2010 028 323 A1 and DE 10 2010 040 547 A1.

The relevant prior art includes DE 10 2009 049 602.5, DE 10 2008 038 747 A1, DE 10 2009 041 161 A1, DE 10 2010 028 322 A1, DE 10 2007 044 635 A1, DE 10 2004 046 584 A1, DE 3302177 A1, U.S. Pat. No. 4,942,539, US 2003/0090682 A1, EP 1 772 199 A1, U.S. Pat. No. 5,150,623, DE 197 45 728 A1, DE 696 32 309 T2 as well as DE 10 2007 061 803 B3.

There are a variety of individual body parts and body parts used in the mass production of vehicle bodies, such as brackets, etc., that are largely assembled by fully automated robots. In a joining or connection process, two or more body parts are first firmly positioned with respect to each other using relatively complex means of clamping and mounting techniques and then they are joined together, e.g. by welding, clinching or other joining methods.

In the above-mentioned DE 10 2010 040 547 A1, there is a plug-in clamping connection by which two or more body parts can be easily (pre-) assembled. A "male fixing element" projects from a first of the at least two components that is introduced in a direction of insertion into a hole-like "female fixing element" that is provided in the other vehicle component. The male fixing element has a functional head that is partially or entirely in the shape of a sphere or that partially or entirely has a spherical shape, whereby the male fixing element provides an interference fit due to being oversized that is substantially lateral to the direction of insertion in the female fixing element. As a result, the two vehicle body parts are clamped to one another by the fixing elements.

In vehicle body construction, body parts that are to be connected with each other are usually held together by means of "component-specific" clamps, and then connected. "Component-specific" means that these clamps are tailored to the geometry of a particular component or two components that are designed to be connected to one another. If the components to be connected to one another do not offer sufficient rigidity, i.e. they have a tendency to "spring apart" after being pressed together in a forming die, the geometry of the component connection to be produced must be defined by specific geometric support points in the clamping device in question. And it is only by welding of a further component that the geometry defined by the clamping device can be set.

Such holding devices require high initial investment. In operation, they occupy valuable production space, which in turn is associated with costs.

There is therefore needed a component connection, which enables pre-fixing of two components that are to be permanently fixed to one another without there being a need for component-specific holding devices for the permanently fixed connection.

According to the invention, this and other needs are met by providing a connection between components with a first component, a second component, and at least two pairs of fixing elements spaced apart from one another and by which the two components are detachably connected to one another. Each pair of fixing elements includes a female fixing element and a male fixing element that is introduced, especially inserted, into the female fixing element. In each case a fixing element of each pair of fixing elements is provided on the first component and the other fixing element of each pair of fixing elements is provided on the second component. The fixing elements are arranged such that on detachable connection of the two components by the pairs of fixing elements in the two components, a bending stress results in the components.

The starting point of the invention is a component connection with a first component and second component that are detachably connected together by at least two pairs of fixing elements arranged at a distance from one another. The term "component" is interpreted very broadly. It includes in particular, but not exclusively, flat components, such as steel or aluminum sheet metal components. The components may, in particular, be body components of a manufactured vehicle body.

Each of the at least two pairs of fixing elements has a female fixing element and a male fixing element that is introduced into the female element, especially plugged in. In each case, one fixing element of each pair of fixing elements is provided on the first component while the other fixing element of each pair of fixing elements is provided on the second component. For example, the male fixing elements may be provided on the first component while the female fixing elements may be provided on the second component. Alternatively, it is also possible to arrange the male fixing element of the first pair of fixing elements on the first component and the associated female fixing element on the second component, and the male fixing element of the second pair of fixing elements on the second component and the associated female fixing element of the second pair of fixing elements on the first component, or vice versa. The fixing elements are arranged such that on the detachable connection of the two components by the pair of fixing elements on the two components, a bending or curving stress is provided in the components.

In this way, a detachable component connection can be "established" between two or more component parts. By means of this detachable connection of two or more components, a "bending stress" can be obtained in the component connection; normally this can only be achieved by use of a specific component or component assembly holding device.

For example, a door of a vehicle includes several metal sheets to be joined together, in particular an outer skin panel that has to be connected and a plurality of textured metal sheets. Before the individual sheets are welded together, the individual sheets are pre-fixed relative to one another; this can be effected in a very simple manner using the above-described component connection and without the need for component or component-specific holding devices.

The fixing elements may, in particular, be so arranged that on detachable connection of the at least two components by the pair of fixing elements on the two components, a bending or curving stress is exerted in the two components in the area between the pair of fixing elements.

The fixing elements can be so arranged that the measured distance along a surface of the first component to the fixing elements provided on the first component differs (slightly) from the measured distance along a surface of the second component to the fixing elements provided on the second component. Such a slight difference in distance "automatically" results in a bending or curving stress in the components on connecting the related fixing elements.

The detachable fixing together of the two components is so arranged that one fixing element is directed along an insertion direction to the other fixing element provided on the other component or is inserted into the fixing element provided on the other component and clamped. Following the detachable connection of the two components, then these are immovably (releasably) fixed with respect to one another in directions lateral to the direction of insertion.

The fixing elements can be designed so that they form a clip or snap connection. It can be arranged that one fixing element engages in the other fixing element or that one fixing element engages in a position behind the other fixing element. Thus a positive locking fit that works against the direction of insertion can be provided between the fixing elements. However, such a lock fit or rear engagement does not necessarily have to be provided.

The two components can be simply frictionally fixed together by way of a pair of fixing elements. Alternatively, the two components can be frictionally and positively fixed together by way of a pair of fixing elements.

After the removable (pre-)fixing of the two components by use of the fixing elements, the components can be inseparably connected to one another, e.g. by welding. A major advantage of the invention is the fact that no other tensioning or clamping devices are needed for the inseparable connection of the two components (e.g. during welding). Rather, it is sufficient that the two components are fixed with respect to one another, before or during the welding process, exclusively by the fixing elements that are detachably connected to one another.

According to a refinement of the invention, a "male fixing element" is used as the first fixing element, i.e. an element that "projects" from the first component in some way or another. In the case of the second fixing element, this is preferably in the form of a female fixing element that cooperates with the male fixing element. The components are clamped together by mutual cooperation or the nesting of the two fixing elements. The term "female fixing element" is also interpreted very broadly. What is meant are constructional designs that cause the male fixing element to be inserted into the female fixing element via a given direction of insertion. The (vehicle) components can then be relatively easily brought together in this way and (pre)fixed to one another in a similar manner to that known in the form of plug-in kits in the field of toys.

The male fixing element is substantially oversized laterally to the insertion direction with respect to the female fixing element, by which the two components are fixed to one another after the plugging together of the fixing elements.

According to one aspect of the invention, an element is used as a first fixing element that is formed as a spherical or ball-like element or that has a spherical or ball-like portion. The male fixing element can be completely made of metal, in particular of steel or aluminum. It can, for example, be firmly bonded to the first component, e.g. by welding. In particular, a ball functioning as a first fixing element can be welded directly onto the first component.

Alternatively, a first fixing element can also be used that has a functional head which is partly or entirely in the shape of a sphere or partly or entirely has a spherical shape and a foot section that is connected with the functional head (e.g. one piece). The foot may, for example, be positively connected to the first component by a cold joining method (e.g. punch rivets, press-fitting, etc.).

Reference herein to "spherical", "ball-like", "spheroidal", etc., are also to be interpreted very broadly and are not limited to the mathematical concept of spherical geometry. "Ball-like" may, for example, mean "convex curved." Preferably, the spherical or spheroidal-shaped male fixing element is rotationally symmetrical with respect to a normal direction of one or both vehicle components at the location of the male fixing element. The terms "ball-like" or "spheroidal" also include the general shapes of "round" or "curved," and especially "convex" geometries.

A male fixing element designed in this way can be closely mated with the second (vehicle) component. A round, edgeless geometry of the male fixing element minimizes the risk that the two (vehicle) components will be unintentionally misaligned when assembling.

If a first fixing element formed by a functional head and an associated foot section is used, then the foot section, generally speaking, can take over the function of a connecting element, via which the functional head is connected to the first component.

The foot section can be cost-effectively designed as a "press-fit element." It can be "pressed" into the second component with high-precision by use of common pressing procedures (such as, e.g. punch rivets) in such a way that by the pressing, a non-detachable, i.e. permanently fixed, form-fitting connection with the first component is obtained. The foot section may, for example, be designed as a self-piercing rivet. The pressing of the foot section can be performed completely automatically by use of a corresponding robotic device.

Alternatively, a pressing device may be integrated into a forming tool. For example, a punch riveting device can be integrated in a thermoforming mold, which makes it possible to place the male fixing element during or towards the end of a deep drawing process through which the first (sheet metal) component is three-dimensionally formed. Alternatively, the foot section could also be in the form of a screw shaft that is intended to be screwed into a corresponding threaded bore in the first component.

Components, including vehicle components, such as, e.g. individual body parts, may be prepared by one or more such pairs of fixing elements connected to one another, i.e. (pre-) mounted. In this case, the individual components only need to be "put together." Depending on the type of (vehicle) components and the type of "clamping force" provided, the two (vehicle) components can be joined together exclusively by such pairs of fixing elements or, additionally, by use of one or more other joining techniques, such as welding, bolting, riveting, clinching, etc. Also to be considered, in particular, are such connection techniques as those that can be carried out working from one side only ("one-sided connection method"). One example of this is laser welding that can be worked from a single side, unlike spot welding of the "component connection" by use of a welding gun that requires accessibility from both sides.

The female fixing element can be formed by a "through hole" provided in the second (vehicle) component. The term "through hole" should also be interpreted broadly and not limited per se to a specific hole geometry. The through hole can, for example, be circular or have a geometry that is different from a circular shape, such as a substantially square geometry, a three, four or polygonal cornered geometry, where the "corners" may be rounded.

Since the at least one male fixing element has a certain oversize with respect to the female fixing element lateral to the direction of insertion, the two fixing elements—or at least one of the two fixing elements—must have a certain "minimum elasticity" to enable mating while leaving sufficient clamping force after plugging in.

The male fixing element or the functional head of the male fixing element can be, for example, a ball made of solid material, particularly a steel or aluminum ball. Such a "solid ball" has relatively low elasticity. The minimum elasticity required for mating can be achieved by appropriate design of the female fixing element.

It can be arranged that following the plugging together of the fixing elements, the two (vehicle) components can be fixed in directions that are lateral to the direction of insertion, and are connected to each other without any play, i.e. they are immovable with respect to one another.

According to another aspect of the invention, there is at least one flexurally elastic clamping element projecting from the second (vehicle) component at one edge of the female fixing element forming the through hole. The clamping element exerts a clamping force from the outside on an outer side of the functional head of the male fixing element that is substantially lateral to the direction of insertion. The clamping element can engage behind the functional head of the male fixing element. However, this does not necessarily have to be the case. If there is an indentation behind, then there is an audible click as the head of the male fixing element engages in the female fixing element during assembly, i.e. when assembling the two fixing elements as a result of a "positive pressure."

The clamping element can be a clamping collar extending along the entire edge of the through hole. Alternatively, the clamping collar element may extend only over a circumferential portion. In addition, a plurality of clamping collars that are circumferentially spaced apart can be provided along the through hole and which engage from the outside with the functional head of the male fixing element at a peripheral point or at a circumferential location. It can also be arranged that only a part of the proposed clamping collars press from the outside against the functional head of the male fixing element.

It can be arranged that the clamping collar or the clamping collars protrude(s) in the direction of insertion or opposite to the direction of insertion of the second (vehicle) component. The at least one clamping collar must not be quite perpendicular with respect to the second vehicle component, but may be at a slight angle. For example, it can be arranged that at least one clamping collar is at an angle in the range between 80° and 90° with respect to the surface of the second (vehicle) component in the region of the through hole.

The first and/or second (vehicle) component may be in the form of a sheet metal component, in particular a body component. Alternatively, the first and/or second (vehicle) component may also be a plastic component, especially a plastic component made of fiber reinforced plastic.

The through hole forming the female fixing element can be punched out of the second (vehicle) component. The clamping collar may be a "bent" or "raised" or upstanding section of the punched out through hole.

One or both of the vehicle components may, in particular, be deep drawn parts. The at least one female fixing element that, for example, is formed by a through hole, can be punched directly in the deep drawing tool or produced in a subsequent manufacturing step.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 9 and 10 show an exemplary component connection according to the invention before and after the connection of two loose components.

DETAILED DESCRIPTION OF THE DRAWINGS

Figure 1:
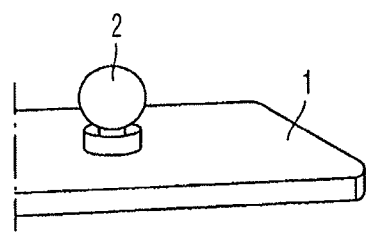
FIG. 1 is a perspective view of a sheet with a welded-steel ball.

FIG. 1 shows a first metal sheet 1 on which a male fixing element is fixed, having a steel ball 2 designed as a functional head.

Figure 2:
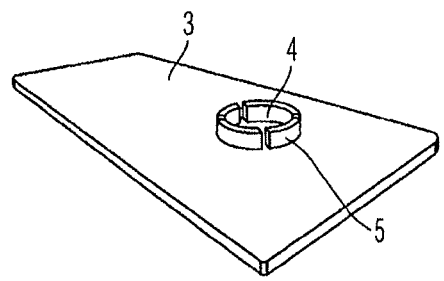
FIGS. 2 and 3 are views of sheets having a through hole with a surrounding clamping collar.
Figure 3:
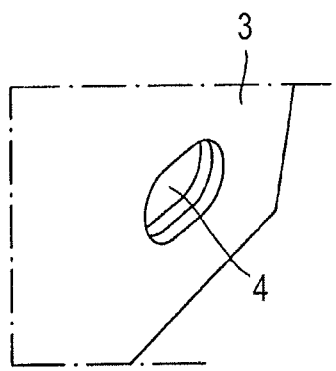

FIGS. 2, 3 show a second sheet 3, in which a through hole 4 is punched, which includes a bent collar 5, which acts as a clamping collar. The through hole 4 or the clamping collar 5 have a slightly smaller diameter than the ball 2 forming the functional head. However, the clamping collar 5 is sufficiently elastic so that the ball 2 can be pressed in and through the through hole 4.

The through hole 4 may, as shown in the FIGS. 2 and 3, have an approximately rectangular or square shape. In the case of an approximately square through hole geometry, the clamping collar 5 presses point-like against the ball 2 from the outside at four locations spaced at about 90° relative to one another.

Figure 4:
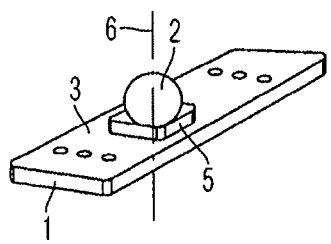
FIGS. 4-6 show various component connection embodiments having different clamping collars.

FIG. 4 shows the two sheets 1 and 3 in a mated state. The ball 2 fixed to the sheet 1 is inserted from below through the through-hole 4. The clamping collar 5 presses against the ball 2 from the outside substantially laterally to a direction of insertion 6. The two sheets 1 and 3 are thus firmly positioned and substantially free of play with respect to one another in directions that are lateral to the insertion direction 6.

Figure 5:
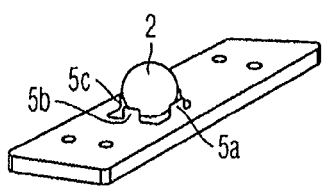

FIG. 5 shows an embodiment wherein, instead of a clamping collar, a plurality of tooth-like clamping collar members 5a, 5b, 5c are provided that are uniformly distributed circumferentially.

Figure 6:
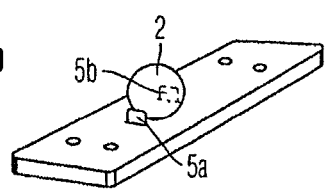

In the embodiment of FIG. 6, only two such tooth-like clamping collar elements 5a, 5b are provided. These collar elements 5a, 5b are spaced circumferentially by about 180° from one another. The two clamping collar members 5a, 5b are disposed on opposite sides of the ball 2.

Figure 7:
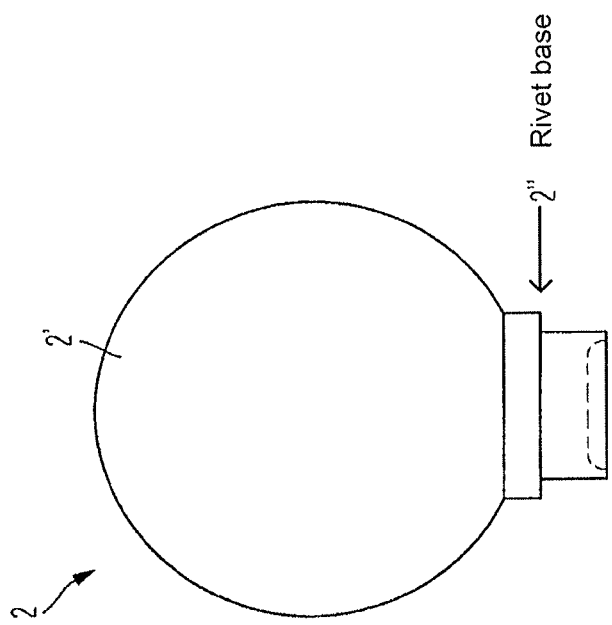
FIG. 7 shows a first embodiment of a male fixing element according to the invention.

FIG. 7 shows a male fixing element 2 having a spherical functional head 2' and a one-piece connected foot or root section 2". The foot section 2" is formed in the shape of a self-piercing rivet. On connecting, i.e. when pressing the foot region 2" that is in the form of a (self-piercing) rivet, the face area of the foot region 2" penetrates the first sheet 1 (see FIG. 1) and then expands radially to result in a permanently fixed, form-fitting connection with the first sheet 1.

Figure 8:
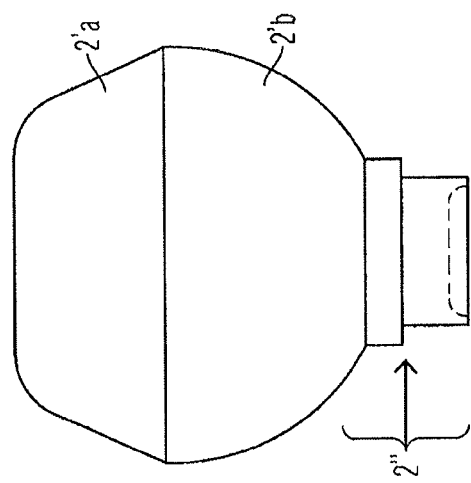
FIG. 8 shows a second embodiment of a male fixing element according to the invention.

FIG. 8 shows an embodiment in which the functional head has an upper, conical upwardly tapered, rounded portion 2'a and a downwardly adjoining spherical portion 2'b that is formed as a self-piercing rivet analogously to the embodiment of FIG. 8.

FIG. 9 shows the components 1 and 3 to be connected loosely. Three balls 2a, 2b, 2c are disposed on an upper surface of the first component 1 at a distance from each other. The balls 2a-2c can be welded onto the top of the first component 1 as shown by welds 20. In the second component 3, associated through-holes 4a, 4b, 4c for the balls 2a-2c are arranged, whereby each through-hole is provided with a clamping collar 5a-5c. The through holes 4b and 4c, for example, are at a distance of $x_1$. The associated balls 2b, 2c on the first component 1 are at a distance $x_2$, which is slightly smaller than the distance $x_1$.

As is apparent from FIG. 10, this means that when connecting the two sheets 1, 3 together, a bending moment results that correspondingly curves the two sheets 1, 3. The two sheets can then be permanently connected, for example, by additional welds 22.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A connection between components, comprising:
a first component;
a second component;
at least two pairs of fixing elements arranged at a distance from one another and by which the first and second components are detachably connected to each other, wherein
each pair of fixing elements comprises a female fixing element and a male fixing element configured for insertion into the female fixing element,
a fixing element of each pair of fixing elements is provided on the first component and the other fixing element of each pair of fixing elements is provided on the second component, and
the fixing elements of the pairs of fixing elements are respectively located on the first and second components to produce a bending stress in the first and second components upon detachably connecting the two components, whereby a bending of the first and second components occurs.

2. The connection between components according to claim 1, wherein the fixing elements are located such that one of the first and second components is subjected to bending stress in a region between the pairs of fixing elements.

3. The connection between components according to claim 1, wherein a measured distance along a surface of the first component between the fixing elements provided on the first component is different from a measured distance along a surface of the second component between the fixing elements provided on the second component.

4. The connection between components according to claim 1, wherein the male fixing element of each pair of fixing elements on one of the first and second components is inserted along an insertion direction into the female fixing element of each pair of fixing elements provided on the other of the first and second components, the male fixing element of each pair of fixing elements being clamped therein.

5. The connection between components according to claim 1, wherein after the detachable connection of the first and second components, the first and second components are immovably fixed with respect to one another in lateral directions with respect to an insertion direction of the male fixing elements into the female fixing elements.

6. The connection between components according to claim 1, wherein the fixing elements provide a clip or snap connection between the first and second components, the fixing elements of each pair of fixing elements positively engaging with one another from behind.

7. The connection between components according to claim 1, wherein the fixing element of each pair of fixing elements are clamped non-positively to one another.

8. The connection between components according to claim 1, wherein the fixing element of each pair of fixing elements are clamped non-positively and positively to one another.

9. The connection between components according to claim 1, wherein the male fixing element of each pair of fixing elements is oversized with respect to an associated female fixing element of each pair of fixing elements.

10. The connection between components according to claim 1, wherein at least one of the male fixing elements of at least one of the pair of fixing elements is at least partially spherical, spheroidal, or comprises a spherical or ball portion.

11. The connection between components according to claim 1, wherein at least one of the male fixing elements of at least one of the pair of fixing elements is made completely of a metal.

12. The connection between components according to claim 1, wherein at least one of the male fixing elements is welded to a respective one of the first and second components.

13. The connection between components according to claim 1, wherein at least one of the male fixing elements comprises:
a functional head having an at least partially sphere or spherical shape; and
a foot section connected to the functional head.

14. The connection between components according to claim 13, wherein the foot section is connected with a respective one of the first and second components by cold joining.

15. The connection between components according to claim 1, wherein the female fixing element of at least one of the pairs of fixing elements comprises a through-hole located in a respective one of the first and second components.

16. The connection between components according to claim 15, wherein the through-hole has a non-circular shape.

17. The connection between components according to claim 15, wherein the through-hole has a substantially square or triangular shape.

18. The connection between components according to claim 15, wherein the female fixing element further comprises a projecting edge of the through-hole, the projecting edge forming an elastic clamping element projecting from the respective component, the clamping element exerting a clamping force from outside, which is substantially lateral to an insertion direction, acting on an outer side of an associated male fixing element.

19. The connection between components according to claim 18, wherein after connecting together the first and second components, the clamping element engages behind the associated male fixing element.

20. The connection between components according to claim 18, wherein the clamping element is a clamping collar extending along an entire edge of the through-hole.

21. The connection between components according to claim 18, wherein the clamping element comprises a plurality of circumferentially spaced clamping collars located along an edge of the through-hole, said clamping collars contacting the associated male fixing element from outside on a peripheral section thereof.

22. The connection between components according to claim 21, wherein the clamping collars are configured to protrude either in the insertion direction or against the insertion direction.

23. The connection between components according to claim 15, wherein the through-hole is a punched through-hole formed in a respective one of the first and second components.

24. The connection between components according to claim 1, wherein at least one of the first and second components is a sheet metal component.

25. The connection between components according to claim 1, wherein at least one of the first and second components is a body part of a vehicle body.

26. A method of permanently connecting first and second components, the method comprising the acts of:

first, detachably connecting the first and second components to one another using at least two pairs of fixing elements, each pair of fixing elements comprising a female fixing element and a male fixing element, wherein in each case, a fixing element of each pair of fixing elements is provided on the first component and the other fixing element of each pair of fixing elements is provided on the second component, wherein the fixing elements are arranged to produce a bending stress in the first and second components upon the detachable connection of the first and second components; and second, permanently bonding the first and second components together after the first and second components are first detachably connected via the at least two pairs of fixing elements.

27. The method according to claim 26, wherein the bonding act comprises the act of welding the first and second components together.

28. The method according to claim 27, wherein the first and second components are held in position with respect to one another before or during the welding exclusively by the detachable connection of the first and second components via the at least two pairs of fixing elements.

* * * * *